United States Patent

[11] 3,601,573

[72] Inventor Albert J. Shutey
 Warren, Mich.
[21] Appl. No. 866,041
[22] Filed Oct. 13, 1969
[45] Patented Aug. 24, 1971
[73] Assignee Chrysler Corporation
 Highland Park, Mich.

[54] FLUXLESS ARGON ARC SOLDERING
 5 Claims, No Drawings

[52] U.S. Cl. .................................................. 219/85
[51] Int. Cl. .................................................. B23k 1/20
[50] Field of Search........................................ 219/85,
 137, 131, 135, 383, 129; 29/488, 494

[56] References Cited
 UNITED STATES PATENTS
 2,487,582 11/1949 Parris ........................... 219/129

| | | | |
|---|---|---|---|
| 2,937,438 | 5/1960 | Lemon ......................... | 29/488 |
| 3,248,514 | 4/1966 | Ramsey ........................ | 219/137 |
| 3,278,720 | 10/1966 | Dixon ........................... | 219/118 |

Primary Examiner—J. V. Truhe
Assistant Examiner—J. G. Smith
Attorney—Harness, Talburtt and Baldwin ABSTRACT: A method of soldering wherein heat is supplied by striking an electric arc between a nonconsumable tungsten electrode and the work. The source for the arc is a bidirectional electric current. A stream of argon gas is supplied to the solder zone to shield the work for oxidation. The argon is conjunction with the bidirectional current provides a cleansing action in the solder zone permitting metallurgical bonding of the solder and work. The method is practiced without the aid of a flux.

FLUXLESS ARGON ARC SOLDERING

BACKGROUND

This invention is concerned generally with fluxless argon arc soldering of various commercial metals. However, it is particularly concerned with an improved method for the fluxless soldering of cast and nodular iron.

Present methods of soldering cast iron involve the use of a hot iron or torch, solder and flux. Normally in the soldering of cast iron it is difficult to obtain uniform wetting and metallurgical bonding without resorting to costly cleaning methods. When cast iron is heated locally to its melting point, such as in welding, and allowed to air cool a hard brittle structure is obtained in the heat affected zone. Also thermal stresses produced on welding often result in cracking of the cast iron. To prevent these undesirable effects preheating and post heating at temperatures of 900° F. to 1,100° F. are resorted to.

SUMMARY

The method of this invention eliminates the need for flux when soldering and provides true metallurgical bonds between the solder and the work. The method in its preferred form involves the use of a standard inert gas (argon) arc welding unit for soldering and substitutes solder for the filler metal rod normally used in gas arc welding.

DESCRIPTION OF PREFERRED EMBODIMENT

According to this invention, metals can be metallurgically joined or repaired by soldering without the use of a flux by adopting the gas arc welding process to he use of solder. It is particularly beneficial in soldering or repairing cast iron and nodular iron, although it is also applicable to most commercial metals and alloys such as copper and its alloys, aluminum and its alloys, steel and its alloys, zinc base alloys, magnesium and its alloys, chromium, and nickel and its alloys.

In practicing the method, an electric arc is struck between an electrode and the work. The arc is used primarily to provide the necessary heat for soldering and is obtained by applying an alternating current (AC) or reverse polarity direct current (DC), both of which are hereinafter referred to collectively as "bidirectional current," to a nonconsumable electrode of the tungsten type. Direct current straight polarity is not suitable with this method. The bidirectional current in combination with argon causes a cleansing action in the solder zone. Simultaneous with the provision of the arc, the solder zone is flooded with welding grade argon gas. Helium gas is not suitable for this method. The various well-known and commercially available gas arc welding torches which have a tungsten electrode enclosed in a gas cup are most suitable for this method. To prevent "rectification" of the arc it is helpful to superimpose a high-frequency additional current on the heating current as is standard practice in gas arc welding.

To effect a repair or form a joint, the arc is played over the solder zone to heat the work to a temperature suitable for melting the solder. Proper temperature has been reached when the solid solder melts as it touches the solder zone on the work. Constant slow movement of the torch over the work will eliminate the possibility of localized over heating. When soldering cast or nodular iron, it is particularly important to avoid fusion of the work. Therefore, sufficient current should be applied to the electrode to melt the solder but not the work.

Following are illustrative conditions found to be satisfactory for soldering cast iron with the solder noted in Table I. Currents of 50 amps were used in the case of AC and 20 amps were used in the case of DC reverse polarity to obtain temperatures in the neighborhood of 700°–800° F. on the work.

TABLE I

| Tungsten Electrode Diameter | Corresponding Cup Size* | Argon Flow (CFH) | Solder |
|---|---|---|---|
| 3/32" | 6 | 50 | |
| 3/32" | 8 | 40 | 93% Zn–3%Al–2%Cu |
| 1/16" | 6 | 40 | |
| 0.040" | 8 | 40 | |
| 1/16" | 6 | 40 | |
| 1/16" | 6 | 40 | |
| | | | 60% Sn–40%Zn |
| 1/16" | 6 | 40 | |
| 3/32" | 8 | 40 | |
| 0.040" | 4 | 40 | |

*Linde Company Designation.

Mild steel was successfully soldered with 95% $Z_n$–5%Al solder with a resultant metallurgical bond. Nodular iron was also soldered with 93% $Z_n$–4%Al–3% Cu by this method and a metallurgical bond was obtained. The metallurgical bonds were confirmed by cross-sectioning and preparation of photomicrographs.

Table II shows several electrical currents found useful in soldering different metals.

TABLE II

| Work | Solder | DC Reverse and H.F.* | | AC and H.F.* |
|---|---|---|---|---|
| | | Amps | Volts | |
| Cast Iron | 60%Sn–40%Zn | 20 | 18 | 50 |
| 0.060" Mild Steel | Same | 20 | 18 | 20 |
| 0.125" Magnesium AZ31B | Same | 20 | 18 | 20 |
| 0.025" Stainless 436 | Same | 15 | 16 | 10 |
| 0.030" Aluminum | Same | 20 | 18 | 20 |
| 0.025" 70/30 Brass | Same | 15 | 16 | 10 |

*H.F.—superimposed high-frequency current as used in welding.

Having described the invention, what is claimed is:

1. A method of fluxless soldering comprising:
    applying bidirectional electrical current between an electrode an an area to be soldered on a workpiece to thereby establish and maintain an electrical arc therebetween capable of heating the solder area to a cleaning and soldering temperature,
    delivering argon gas to the area in the presence of the arc to form a protective gaseous shield in the area and initiate a cleaning action in combination with the bidirectional current for the soldering operation, and
    providing solder in the area in the presence of the arc and the argon and maintaining it there until it is heated to its melting point whereby soldering of the workpiece is effected.

2. The method of claim 1 wherein the workpiece to be soldered is made of iron.

3. The method of claim 2 wherein the solder is a zinc base solder.

4. The method of claim 1 wherein the current is reverse polarity DC.

5. The method of claim 1 wherein the current is AC.